(12) United States Patent
Balasubramanian et al.

(10) Patent No.: US 8,276,708 B1
(45) Date of Patent: Oct. 2, 2012

(54) HEADLINERS AND VEHICLES WITH IMPROVED SPEECH TRANSMISSION CHARACTERISTICS

(75) Inventors: Ashwini Balasubramanian, Livonia, MI (US); Jay M. Zocher, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/048,228

(22) Filed: Mar. 15, 2011

(51) Int. Cl.
*E04B 1/84* (2006.01)
(52) U.S. Cl. ........................................ 181/286; 181/290
(58) Field of Classification Search .................. 181/286, 181/290
See application file for complete search history.

(56) References Cited

U.S. PATENT DOCUMENTS

| | | | |
|---|---|---|---|
| 5,016,936 | A | 5/1991 | Goodrich |
| 5,068,001 | A | 11/1991 | Haussling |
| 5,976,295 | A | 11/1999 | Ang |
| 6,951,264 | B2 * | 10/2005 | Byma et al. ............ 181/286 |
| 7,648,753 | B2 | 1/2010 | Asbury |
| 2003/0026968 | A1 | 2/2003 | Kojima |
| 2008/0001431 | A1 | 1/2008 | Thompson et al. |
| 2008/0099278 | A1 * | 5/2008 | Simon et al. ........... 181/293 |
| 2010/0219014 | A1 | 9/2010 | Oosting et al. |

OTHER PUBLICATIONS

Fabio Bozzoli, Angelo Farina, "Measurement of the Speech Intelligibility Inside Cars", Audio Engineering Society, AES 113th Convention, Oct. 2002, Paper 5702.
"ALPHA Cabin System for the Measurement of the Acoustic Absorption of Materials and Parts used in Automotive Acoustics", Rieter Automotive Management AG, Jun. 6, 2007.
British Standard BS EN 60268-16: 2003, "Sound system equipment, Part 16: Objective rating of speech intelligibility by speech transmission index" (IEC 60268-16:2003), 2004.

* cited by examiner

*Primary Examiner* — Jeremy Luks
(74) *Attorney, Agent, or Firm* — Dinsmore & Shohl LLP

(57) ABSTRACT

Headliners for vehicles and vehicles incorporating the same are disclosed. In one embodiment, a vehicle includes an enclosed passenger compartment at least partially bounded by a roof structure. A headliner may be attached to an inboard side of the roof structure. The headliner may include an acoustical attenuator portion attached to an inboard side of the roof structure and an acoustical reflector portion attached to an inboard side of the acoustical attenuator portion. The acoustical attenuator portion absorbs acoustic energy incident on an outboard surface of the roof structure and the acoustical reflector portion reflects acoustic energy incident on an inboard side of the acoustical reflector portion. The enclosed passenger compartment has a Speech Transmission Index greater than 0.56 for acoustic energy incident on the inboard side of the acoustical reflector portion.

20 Claims, 3 Drawing Sheets

HEADLINERS AND VEHICLES WITH IMPROVED SPEECH TRANSMISSION CHARACTERISTICS

TECHNICAL FIELD

The present specification generally relates to headliners for vehicles and, more specifically, to headliners with improved speech transmission characteristics and vehicles incorporating the same.

BACKGROUND

Passenger vehicles generally include a headliner which is positioned on the interior of the roof of the passenger compartment of the vehicle. Conventional headliners serve a variety of purposes. For example, the headliner serves as an aesthetic embellishment which obscures the inboard surface of the sheet metal of the roof of the vehicle as well as any vehicle components, such as wiring harness, conduits, ducts and the like, which may be affixed to the inboard surface of the roof. Conventional headliners are also used to mitigate the amount of environmental noise which enters the passenger compartment from sources external to the passenger compartment (i.e., road noise, engine noise, wind noise, etc.) to produce a more pleasurable driving experience for the vehicle occupants.

However, while conventional headliners are effective at mitigating environmental noise, such headliners also attenuate noise which originates from within the passenger compartment, such as speech and music. In cases where speech transmission is mitigated or attenuated, it may be difficult for passengers to carry on a conversation within the vehicle. Similarly, when a vehicle incorporates systems which are activated by voice commands, the mitigation or attenuation of speech transmission may make it difficult or impossible to properly operate these systems.

Accordingly, a need exists for headliners for vehicles with improved speech transmission characteristics and vehicles incorporating the same.

SUMMARY

In one embodiment, a vehicle includes an enclosed passenger compartment at least partially bounded by a roof structure. A headliner may be attached to an inboard side of the roof structure. The headliner may include an acoustical attenuator portion attached to an inboard side of the roof structure and an acoustical reflector portion attached to an inboard side of the acoustical attenuator portion. The acoustical attenuator portion absorbs acoustic energy incident on an outboard surface of the roof structure and the acoustical reflector portion reflects acoustic energy incident on an inboard side of the acoustical reflector portion. The enclosed passenger compartment has a Speech Transmission Index greater than 0.56 for acoustic energy incident on the inboard side of the acoustical reflector portion.

In another embodiment, a vehicle includes an enclosed passenger compartment at least partially bounded by a roof structure. A headliner may be attached to an inboard side of the roof structure. The headliner may include an acoustical attenuator portion attached to an inboard side of the roof structure the acoustical attenuator portion absorbing acoustic energy incident on an outboard surface of the roof structure. The acoustical attenuator portion may have a random incidence absorption coefficient greater than about 0.5 for acoustical energy with center frequencies from about 1.3 kHz to about 10 kHz incident on an outboard side of the acoustical reflector portion. The headliner may also include an acoustical reflector portion attached to an inboard side of the acoustical attenuator portion. The acoustical reflector portion may have a random incidence absorption coefficient of less than 0.40 for acoustical energy with center frequencies from about 1 kHz to about 10 kHz incident on an inboard side of the acoustical reflector portion. The enclosed passenger compartment has a Speech Transmission Index greater than 0.56 for acoustic energy incident on the inboard side of the acoustical reflector portion.

In yet another embodiment, a headliner for a vehicle includes an acoustical reflector portion and an acoustical attenuator portion. The acoustical reflector portion may include a lining layer having a mass per unit area of less than 150 $g/m^2$, a foam layer bonded to an outboard side of the lining layer, the foam layer having a density less than about 0.035 $g/m^3$, and a barrier layer bonded to an outboard side of the foam layer, the barrier layer having a mass per unit area less than about 130 $g/m^2$. Then acoustical attenuator portion includes a lofted mat bonded to an outboard side of the barrier layer, and a scrim layer bonded to an outboard side of the lofted mat. The headliner may have a random incidence absorption coefficient of less than 0.4 for acoustical energy incident on an inboard side of the lining layer with center frequencies from about 1.6 Hz to about 10 kHz.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
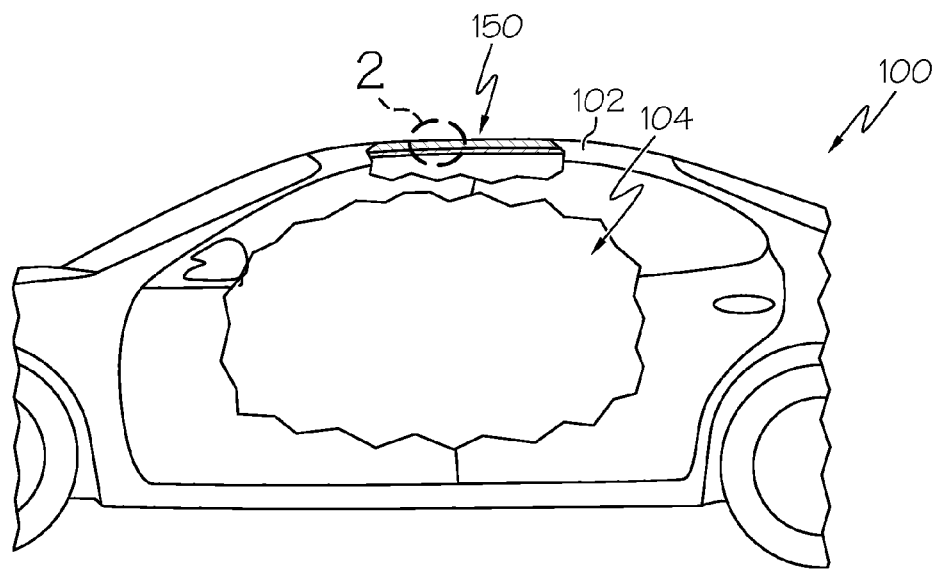
FIG. 1 schematically depicts a vehicle with a headliner according to one or more embodiments shown and described herein.

FIG. 1 generally depicts a vehicle with an enclosed passenger compartment having improved speech transmission characteristics. The enclosed passenger compartment is at least partially bounded by a roof structure. A headliner is attached to an inboard surface of the roof structure. The headliner includes an acoustic attenuator portion attached to an inboard surface of the roof structure and an acoustic reflector portion attached to an inboard surface of the acoustic attenuator portion such that the enclosed passenger compartment has a Speech Transmission Index greater than 56% for acoustic energy incident on the inboard side of the acoustical reflector portion. Various embodiments of the vehicle and headliner will be described in more detail herein.

In describing embodiments of the headliner and vehicle, the terms "inboard" and "outboard" will be used to describe the relative positioning of various components. The term "inboard", as used herein, refers to a side or surface of a layer or structure closest to the interior of the passenger compartment of a vehicle while the term "outboard" refers to a side or surface of a layer or structure furthest from the interior of the passenger compartment of the vehicle.

Further, the term "Speech Transmission Index", as used herein, refers to the intelligibility of an acoustic signal transmitted in the passenger compartment of the vehicle. The values for the Speech Transmission Index described herein were measured according to the paper entitled "Measurement of the Speech Intelligibility Inside Cars" by Angelo Farina and Fabio Bozzoli and presented at the 113$^{th}$ Convention of the Audio Engineering Society in Los Angeles, Calif., Oct. 5-8, 2002.

The "random incidence absorption coefficient" refers to the ability of a material to absorb and dampen acoustic energy. The values for the random incidence absorption coefficient described herein were measured with an Alpha Cabin System manufactured by Rieter Automotive Management AG. Values for the random incidence absorption coefficient were measured for acoustic energy incident on the inboard side of the headliner over the center frequency range from 400 Hz to 10 kHz. In some instances, the random incidence absorption coefficient was also measured for acoustic energy incident on the outboard side of the headliner over the same range of center frequencies.

Figure 2:
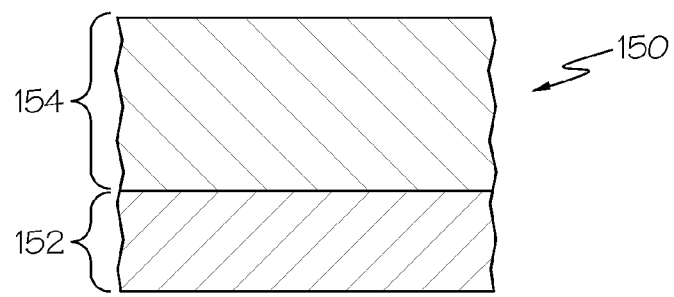
FIG. 2 generally depicts a cross section of a headliner for a vehicle according to one or more embodiments shown and described herein.

Referring now to FIGS. 1 and 2, a vehicle 100 includes an enclosed passenger compartment 104 which is at least partially bounded by a roof structure 102. A headliner 150 is attached to an inboard surface of the roof structure 102. In the embodiments described herein, the headliner 150 is constructed with an acoustic attenuator portion 154 and an acoustic reflector portion 152. The headliner 150 is affixed in the passenger compartment with the acoustic attenuator portion 154 of the headliner 150 directly adjacent to an inboard surface of the roof structure 102 such that acoustic energy incident on the outboard surface of the roof structure is absorbed and attenuated by the acoustic attenuator portion 154 of the headliner without being reflected. In some embodiments described herein, the headliner 150 has a random incidence absorption coefficient of greater than about 0.5 for acoustical energy with center frequencies from about 1.3 kHz to about 10 kHz incident on the outboard side of the headliner. In other embodiments, the headliner 150 has a random incidence absorption coefficient of greater than about 0.6 for acoustical energy with center frequencies from about 1.6 kHz to about 10 kHz incident on the outboard side of the headliner. In other embodiments described herein, the headliner 150 has a random incidence absorption coefficient of greater than about 0.5 and less than about 0.9 for acoustical energy with center frequencies from about 1.3 kHz to about 10 kHz incident on the outboard side of the headliner. Accordingly it should be understood that, for acoustic energy incident on the outboard side of the headliner, the headliner 150 is more reflective than absorptive.

Still referring to FIGS. 1 and 2, the acoustic reflector portion 152 is attached to an inboard surface of the acoustic attenuator portion 154 such that acoustic energy incident on the inboard surface of acoustic reflector portion 152 is reflected back into the passenger compartment of the vehicle with minimal attenuation by the headliner 150. In some embodiments described herein, the headliner 150 has a random incidence absorption coefficient of less than about 0.4 for acoustical energy with center frequencies from about 1 kHz to about 10 kHz incident on the inboard side of the headliner. In other embodiments described herein, the headliner 150 has a random incidence absorption coefficient of greater than about 0.2 and less than about 0.4 for acoustical energy with center frequencies from about 1 kHz to about 10 kHz incident on the inboard side of the headliner. In other embodiments described herein, the headliner 150 has a random incidence absorption coefficient of greater than about 0.2 and less than about 0.3 for acoustical energy with center frequencies from about 1.25 kHz to about 2.5 kHz incident on the inboard side of the headliner. Accordingly it should be understood that, for acoustic energy incident on the inboard side of the headliner, the headliner 150 is more reflective than absorptive while, for acoustic energy incident on the outboard side of the headliner (i.e., acoustic energy incident on the roof of the vehicle), the headliner 150 is more absorptive than reflective.

In the embodiments of the headliner 150 described herein the ratio of the random incidence absorption coefficient for acoustical energy incident on the outboard side of the headliner to the random incidence absorption coefficient for acoustical energy incident on the inboard side of the headliner is greater than 1.0 for center frequencies from about 1.3 kHz to about 10 kHz or even greater than about 2.0 for center frequencies from about 1.3 kHz to about 10 kHz. Maintaining the ratio of the random incidence absorption coefficient for acoustical energy incident on the outboard side of the headliner to the random incidence absorption coefficient for acoustical energy incident on the inboard side of the headliner greater than 1.0 decreases the amount of ambient or environmental noise entering the passenger compartment from external sources while promoting the reflection of acoustical signals originating from within the passenger compartment back into the passenger compartment thereby improving the speech transmission index of the passenger compartment of vehicles in which the headliner is installed.

Figure 3:
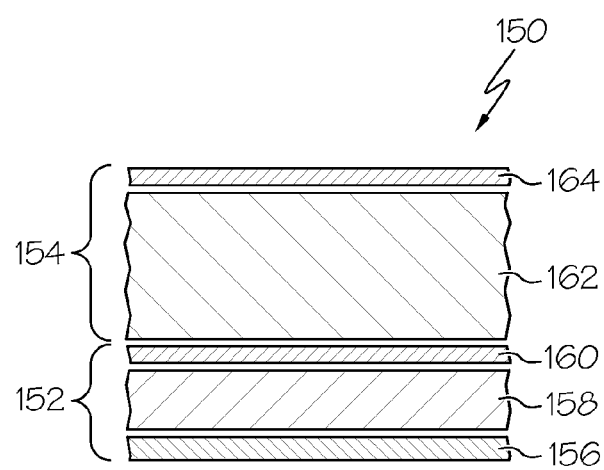
FIG. 3 generally depicts a cross section of a headliner for a vehicle showing the individual layers of the acoustic attenuator portion and the acoustic reflector portion according to one or more embodiments shown and described herein.

Referring now to FIG. 3, the headliner 150 may be constructed from a plurality of layers of different material to achieve the desired acoustical characteristics within the passenger compartment of a vehicle in which the headliner is installed. In one embodiment, the acoustic attenuator portion 154 of the headliner 150 is constructed from a lofted mat layer 162, and a scrim layer 164. The lofted mat layer 162 is the inboard-most layer of the acoustic attenuator portion 154 and is constructed from a material with a suitable mass per unit area and thickness such that the acoustic attenuator portion 154 absorbs and attenuates acoustic energy rather than reflecting the acoustic energy. For example, the lofted mat layer 162 may generally have a thickness from about 1.5 mm to about 5 mm and a mass per unit area from about 500 g/m$^2$ to about 1000 g/m$^2$. In one embodiment, the lofted mat layer 162 is constructed from a composite material, such as a fiber-glass-polymer composite material. One example of a suitable composite material is a composite of fiber glass and polypropylene such as XLT-B manufactured by Azdel, Inc. which has a mass per unit area of about 650 g/m² and a thickness of about 3.75 mm. The lofted mat layer 162 not only provides attenuation of acoustic energy, but also serves as a structural layer which can be molded and formed to give the headliner 150 the desired final shape.

A scrim layer 164 is bonded to the outboard surface of the lofted mat layer 162. The scrim layer is generally a loosely woven, fibrous material which provides the lofted mat layer 162 with an adhesion surface. The scrim layer 164 generally has a thickness of less than about 1 mm and a mass per unit area from about 17 g/m² to about 20 g/m². In one embodiment described herein the scrim layer 164 is formed from polymeric fibers, such as polyethylene terephthalate fibers, or similar polymeric fibers, such that the scrim layer 164 has a mass per unit area of about 20 g/m² and a thickness of about 0.11 mm. However, it should be understood that the scrim layer 164 may be formed from other fibrous materials, including, without limitation, natural fibers (i.e., cotton and the like), synthetic fibers, or combinations thereof. The scrim layer 164 is thermally bonded to the lofted mat layer 162.

Still referring to FIG. 3, in one embodiment, the acoustic reflector portion 152 of the headliner 150 is constructed from a lining layer 156, foam layer 158, and a barrier layer 160. The lining layer 156 is the inboard-most layer of the acoustic reflector portion 152 and is constructed from a material with the desired cosmetic appearance but also with a suitably low mass per unit area and thickness such that acoustic energy is easily transmitted through the lining layer with little or no attenuation. For example, the lining layer 156 may generally have a thickness from about 0.4 mm to about 0.65 mm and a mass per unit area of less than about 150 g/m², generally from about 70 g/m² to about 150 g/m². In one embodiment, the lining layer 156 is constructed from flat-knit face fabric made from natural fibers, synthetic fibers or a blend of natural and synthetic fibers. One example of a suitable flat-knit face fabric from which the lining layer 156 may be constructed is Shawmut Hana fabric manufactured by Shawmut Corporation which has a mass per unit area of about 70 g/m² and a thickness of about 0.5 mm. The lining layer 156 not only provides the desired cosmetic appearance to the headliner 150, but also facilitates transmitting acoustic energy to and from the barrier layer 160 with little or no attenuation.

The foam layer 158 is bonded to the outboard side of the lining layer 156 and generally provides structural rigidity to the lining layer 156 while, at the same time, maintaining the "soft touch" aesthetic of the headliner 150. Like the lining layer 156, the foam layer 158 is constructed from a material with a suitably low mass per unit area and thickness such that acoustic energy is easily transmitted through the lining layer 156 with little or no attenuation. For example, in one embodiment, the foam layer 158 is formed from open cell polyurethane foam having a thickness from about 2 mm to about 4 mm and a density of less than about 0.035 g g/cm³, generally from about 0.03 g/cm³ to about 0.035 g/cm³. In one embodiment, the polyurethane foam utilized as the foam layer 158 has a thickness of about 2.0 mm and a density of about 0.03 g/cm³.

The barrier layer 160 is bonded to the outboard side of the foam layer 158 and to the inboard side of the lofted mat layer 162 of the acoustic attenuator portion 154 of the headliner 150. The barrier layer 160 is constructed from a material or materials of suitable thickness and mass per unit area such that the barrier layer 160 is reflective of acoustic energy having center frequencies within the audible range of human hearing (i.e. frequencies up to about 20 kHz). In the embodiments described herein, the barrier layer 160 generally has a total thickness from about 0.1 mm to about 0.3 mm and a mass per unit area of less than about 130 g/m². generally from about 35 g/m² to about 121 g/m².

Figure 4:
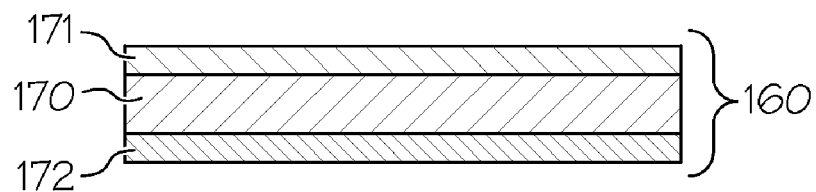
FIG. 4 generally depicts one embodiment of a barrier layer of the headliner of FIG. 3 according to one or more embodiments shown and described herein.

Referring now to FIG. 4, in one embodiment, the barrier layer 160 is constructed as a three layer structure which generally consists of a polymeric sheet 170 disposed between an upper adhesive layer 171 and a lower adhesive layer 172. The polymeric sheet 170 may be any polymer with the desired reflective characteristics at the frequencies of interest. For example, in one embodiment the polymeric sheet 170 is formed from nylon 6. However, it should be understood that the polymeric sheet 170 may be formed from other materials.

The upper adhesive layer 171 may be formed from an adhesive material which is suitable for bonding the barrier layer 160 to the lofted mat layer 162 of the acoustic attenuator portion 154. For example, when the lofted mat layer 162 is formed from polypropylene, the upper adhesive layer 171 may be a polypropylene-based adhesive to facilitate bonding the barrier layer 160 to the lofted mat layer.

Similarly, the lower adhesive layer 172 may be formed from an adhesive material which is suitable for bonding to the foam layer 158 of the acoustic reflector portion 152. For example, when the foam layer 158 is formed from polyurethane foam, the lower adhesive layer 172 may be an adhesive suitable for bonding to polyurethane foam, such as ethylene acrylic acid (EAA) copolymer adhesive.

In one embodiment, the barrier layer 160 is formed from a commercially available three-layer barrier film such as B5 film manufactured by Azdel. Inc. and which has a thickness of 0.127 mm and a mass per unit area of 121 g/m². However it should be understood that other barrier films with suitable acoustical characteristics may also be employed.

In the embodiments described herein, the scrim layer 164, lofted mat layer 162 and barrier layer 160 are pre-laminated as a single sheet while the lining layer 156 and the foam layer 158 are pre-laminated as a separate sheet. The two pre-laminated sheets are then placed in an oven, such as an infrared oven, where they are thermally bonded together to form the headliner and then transferred to a cold press where they are molded into the desired form as the materials cool.

Figure 5:
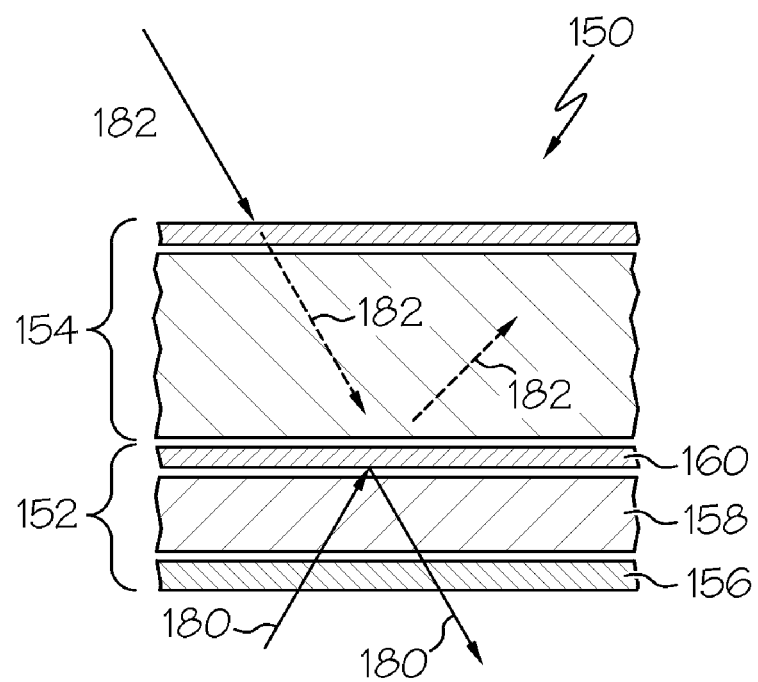
FIG. 5 schematically depicts acoustic energy incident on both the outboard and inboard surfaces of the headliner of FIG. 3.

Referring now to FIG. 5, the interaction between acoustic energy incident on the outboard and inboard surfaces of the headliner 150 is schematically depicted. As shown in FIG. 5, external acoustic energy 182 (e.g., environmental noise, engine noise, etc.) incident on the outboard surface of the acoustic attenuator portion 154 of the headliner 150 enters the acoustic attenuator portion 154 without substantial reflection. As the external acoustic energy 182 propagates through the acoustic attenuator portion 154 of the headliner 150, the external acoustic energy 182 is attenuated and absorbed (schematically depicted by broken arrows) in the acoustic attenuator portion 154 such that the intensity of the external acoustic energy 182 is substantially diminished before reaching the acoustic reflector portion 152 of the headliner. In the event that the external acoustic energy 182 reaches the acoustic reflector portion 152 without being completely attenuated and absorbed, the external acoustic energy 182 is substantially reflected by the acoustic reflector portion 152 back into the acoustic attenuator portion where it is further absorbed and attenuated. Accordingly, it should be understood that very little external acoustic energy 182 is transmitted through the headliner 150 and into the enclosed passenger compartment of the vehicle and, as such, the interior of the passenger compartment is insulated from external environmental noise.

In contrast, internal acoustic energy 180 incident on the inboard surface of the acoustic reflector portion 152 of the headliner 150 (e.g., speech and/or music originating from the enclosed passenger compartment) enters the acoustic reflector portion 152 and propagates through the lining layer 156 and the foam layer 158 with little attenuation until the internal acoustic energy 180 reaches the barrier layer 160. The barrier layer 160 reflects the internal acoustic energy 180 back through the foam layer 158 and the lining layer 156 and out of the headliner 150 and back into the enclosed passenger compartment of the vehicle. As noted herein, the random incidence absorption coefficient for acoustic energy incident on the inboard surface of the headliner is less than about 0.4 for center frequencies between about 1 kHz to about 10 k Hz.

Vehicle headliners constructed with an acoustic attenuator portion 154 and an acoustic reflector portion 152, as described herein, not only have a low random incidence absorption coefficient for acoustic energy incident on the inboard side of the headliner 150, but also improve the speech transmission characteristics (as quantified by the Speech Transmission Index) of the passenger compartments of vehicles for which they are installed. The Speech Transmission Index is a measure of the intelligibility of an acoustic signal propagated in a given space. The passenger compartments of vehicles in which the headliners described herein are installed may have a Speech Transmission Index (STI) of greater than about 0.56. In other embodiments, the STI of the passenger compartments in which the headliners are installed may be greater than about 0.58. In still other embodiments, the STI of the passenger compartments in which the headliners are installed may be greater than about 0.60.

EXAMPLES

The following Examples are presented to illustrate the improvement in the speech transmission characteristics of passenger compartments of vehicles in which headliners according to the embodiments described herein are installed.

Example 1

A headliner having a structure similar to that shown in FIG. 3 was constructed and installed in a large-size passenger sedan. The acoustic reflector portion of the headliner was constructed with a liner layer formed from Shawmut Hana Fabric having a mass per unit area of 70 g/m$^2$ and a thickness of 0.5 mm; a foam layer formed from open cell polyurethane foam with a density of 0.03 g/cm$^3$; and a barrier layer of B5 film having a mass per unit area of 121 g/m$^2$ and a thickness of 0.3 mm. The acoustic attenuator portion of the headliner was constructed with a lofted mat layer formed from Azdel XLT-B glass fiber/polypropylene composite material with a mass per unit area of 650 g/cm$^3$ and a thickness of 3.75 mm; and a PET scrim layer having a thickness of less than 0.1 mm and a mass per unit area of 20 g/m$^2$. The random incidence absorption coefficient for acoustic energy incident on the inboard surface of samples of the headliner was measured with the Alpha Cabin System manufactured by Rieter Automotive Management AG. The Speech Transmission Index of the passenger compartment in which the headliner was installed was measured as described hereinabove. The results of the random incidence absorption coefficient measurement and the Speech Transmission Index measurement are graphically depicted in FIGS. 6 and 7, respectively.

Comparative Example 1

A conventional headliner was installed in a large-size sedan identical to that used in Example 1. The conventional headliner had a multilayer constructions which consisted of, from the outboard side to the inboard side, a combination barrier film and scrim layer having a mass per unit area of 54 g/m$^2$ and a thickness of 0.105 mm; a polyethylene terephthalate bonding layer having a mass per unit area of 17 g/m$^2$ and a thickness of about 0.11 mm; a composite fiberglass/polypropylene lofted mat layer having a mass per unit area of 870 g/m$^2$ and a thickness of 3.5 mm; an adhesive film layer having a mass per unit area of 23 g/m$^2$ and a thickness of 0.5 mm; a non-woven scrim layer having a mass per unit area of 130 g/m$^2$ and a thickness of 1.5 mm; a polyurethane foam layer having a density of 0.03 g/cm$^3$ and a thickness of 2.5 mm; and an inner-most layer of knit fabric having a mass per unit area of 70 g/m$^2$ and a thickness of 1.0 mm. As with Example 1, the random incidence absorption coefficient for acoustic energy incident on the inboard surface of samples of the comparative headliner was measured with the Alpha Cabin System manufactured by Rieter Automotive Management AG. The Speech Transmission Index of the passenger compartment in which the comparative headliner was installed was measured as described herein above. The results of the random incidence absorption coefficient measurement and the Speech Transmission Index measurement are graphically depicted in FIGS. 6 and 7, respectively.

Figure 6:
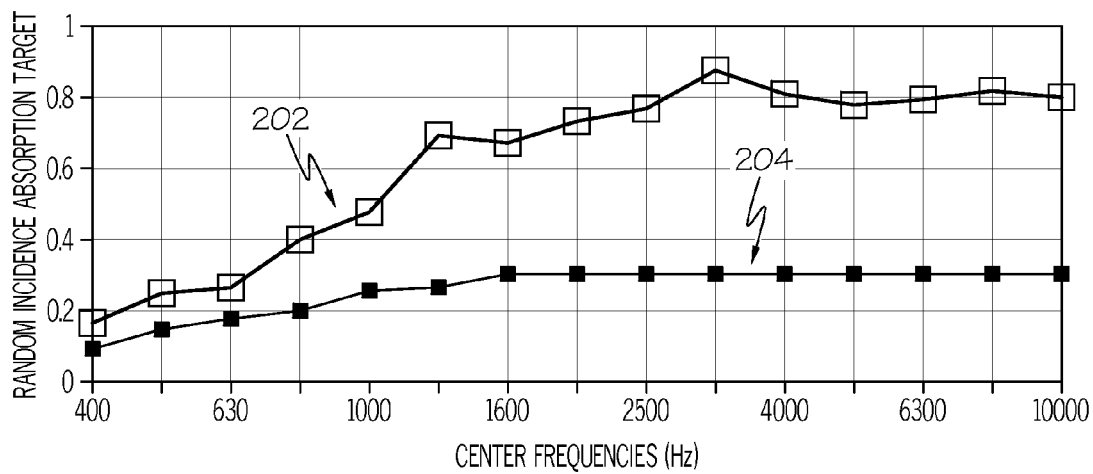
FIG. 6 graphically depicts the random incidence absorption coefficient for acoustic energy incident on an inboard side of the headliner of FIG. 2 and a conventional headliner as a function of the center frequencies of the acoustic energy.
Figure 7:
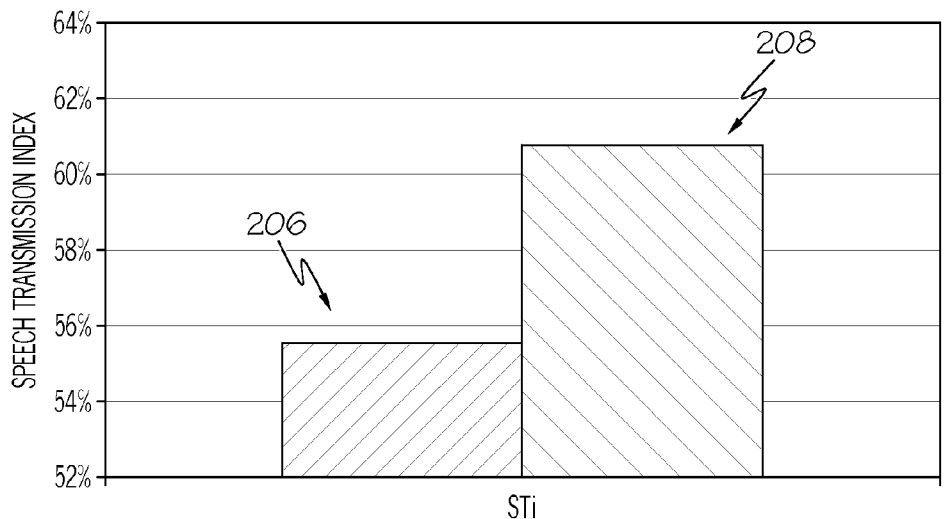
FIG. 7 graphically depicts the Speech Transmission Index for acoustic energy incident on an inboard side of the headliner of FIG. 2 and a conventional headliner.

Referring now to FIGS. 6 and 7, FIG. 6 depicts the random incidence absorption coefficient for the headliner of Example 1 (curve 204) and for the headliner of Comparative Example 1 (curve 202) as a function the center frequencies of acoustic energy incident on the inboard surface of each headliner. As indicated in FIG. 6, the random incidence absorption coefficient of the headliner of the Comparative Example was greater than about 0.4 over the center frequency range from about 1 kHz to about 10 kHz and greater than about 0.6 over the center frequency range from about 1.6 kHz to about 10 kHz indicating that the headliner was highly absorptive (i.e., not reflective). In contrast, FIG. 6 shows that the random incidence absorption coefficient of the headliner of Example 1 was less than 0.4 over the entire range of center frequencies and, in particular, over the range of center frequencies from about 1 kHz to about 10 kHz, thus indicating that the headliner of Example 1 was more reflective (i.e., less absorptive) than the conventional headliner of the Comparative Example.

The Speech Transmission Indices for the passenger compartment of the vehicle with the headliner of Example 1 (bar 208) and for the passenger compartment of the vehicle with the conventional headliner of Comparative Example 1 (bar 206) are graphically depicted in FIG. 7. As shown in FIG. 7, the STI of the passenger compartment of the vehicle with the conventional headliner of Comparative Example 1 was less than about 0.56 while the STI of the passenger compartment of the vehicle with the reflective headliner of Example 1 was greater than 0.60. Accordingly, the intelligibility of speech transmitted in the passenger compartment with the headliner of Example 1 was greater than the intelligibility of speech transmitted in the passenger compartment with the conventional headliner of Comparative Example 1.

It should now be understood that the headliners described herein with an acoustic attenuator portion and an acoustic reflector portion may be utilized to both decrease the amount of environmental noise which enters the passenger compartment of a vehicle as well as to improve the speech transmission within the passenger compartment of the vehicle. In particular, the acoustic attenuator portion of the headliner mitigates environmental noise such that the passenger compartment of the vehicle is quieter and, as such, acoustic energy which originates from within the passenger compartment, such as speech, music or the like, can be readily heard without interference from background noise. Moreover, the acoustic reflector portion of the headliner reflects acoustic energy incident on the inboard surface of the headliner thereby improving the intelligibility of speech and other acoustic signals which originate from within the passenger compartment of the vehicle.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
an enclosed passenger compartment at least partially bounded by a roof structure;
a headliner attached to an inboard side of the roof structure, the headliner consisting of an acoustical attenuator portion attached to an inboard side of the roof structure and an acoustical reflector portion attached to an inboard side of the acoustical attenuator portion, the acoustical attenuator portion absorbing acoustic energy incident on an outboard surface of the roof structure and the acoustical reflector portion reflecting acoustic energy incident on an inboard side of the acoustical reflector portion,
wherein the acoustical reflector portion consists of:
a lining layer having a mass per unit area of less than 150 g/m$^2$;
a foam layer bonded to an outboard side of the lining layer, the foam layer having a density less than about 0.035 g/cm$^3$; and
a barrier layer bonded to an outboard side of the foam layer, the barrier layer having a mass per unit area less than about 130 g/m$^2$;
wherein the enclosed passenger compartment has a Speech Transmission Index greater than 0.56 for acoustic energy incident on the inboard side of the acoustical reflector portion.

2. The vehicle of claim 1, wherein the enclosed passenger compartment has a Speech Transmission Index greater than 0.58 for acoustic energy incident on the inboard side of the acoustical reflector portion.

3. The vehicle of claim 1, wherein the enclosed passenger compartment has a Speech Transmission Index greater than 0.60 for acoustic energy incident on the inboard side of the acoustical reflector portion.

4. The vehicle of claim 1, wherein the headliner has a random incidence absorption coefficient of less than 0.40 for acoustical energy with center frequencies from about 1 kHz to about 10 kHz incident on an inboard side of the headliner.

5. The vehicle of claim 1, wherein the headliner has a random incidence absorption coefficient from about 0.20 to about 0.40 for acoustical energy with center frequencies from about 1 kHz to about 10 kHz incident on an inboard side of the headliner.

6. The vehicle of claim 1, wherein:
the acoustical attenuator portion comprises:
a lofted mat bonded to an outboard side of the barrier layer, the lofted mat formed from a combination of glass fibers and polypropylene fibers; and
a scrim layer bonded to an outboard side of the lofted mat.

7. A vehicle comprising:
an enclosed passenger compartment at least partially bounded by a roof structure;
a headliner attached to an inboard side of the roof structure, the headliner consisting of:
an acoustical attenuator portion attached to an inboard side of the roof structure the acoustical attenuator portion absorbing acoustic energy incident on an outboard surface of the roof structure, the acoustical attenuator portion having a random incidence absorption coefficient greater than about 0.5 for acoustical energy with center frequencies from about 1.3 kHz to about 10 kHz incident on an outboard side of the acoustical attenuator portion; and
an acoustical reflector portion attached to an inboard side of the acoustical attenuator portion, the acoustical reflector portion having a random incidence absorption coefficient of less than 0.40 for acoustical energy with center frequencies from about 1 kHz to about 10 kHz incident on an inboard side of the acoustical reflector portion,
wherein the enclosed passenger compartment has a Speech Transmission Index greater than 0.56 for acoustic energy incident on the inboard side of the acoustical reflector portion.

8. The vehicle of claim 7, wherein the acoustical reflector portion consists of:
a lining layer having a mass per unit area of less than 150 g/m$^2$;
a foam layer bonded to an outboard side of the lining layer, the foam layer having a density less than about 0.035 g/cm$^3$; and
a barrier layer bonded to an outboard side of the foam layer, the barrier layer having a mass per unit area less than about 130 g/m$^3$.

9. The vehicle of claim 7, wherein the enclosed passenger compartment has a Speech Transmission Index greater than 0.58 for acoustic energy incident on the inboard side of the acoustical reflector portion.

10. The vehicle of claim 7, wherein a ratio of a random incidence absorption coefficient for acoustical energy incident on the outboard side of the headliner to a random incidence absorption coefficient for acoustical energy incident on the inboard side of the headliner is greater than 1.0 for center frequencies from about 1.3 kHz to about 10 kHz.

11. The vehicle of claim 7, wherein the headliner has a random incidence absorption from about 0.20 to about 0.40 for acoustical energy with center frequencies from about 1 kHz to about 10 kHz incident on an inboard side of the headliner.

12. A headliner for a vehicle comprising:
an acoustical reflector portion comprising:
a lining layer having a mass per unit area of less than 150 g/m$^2$;
a foam layer bonded to an outboard side of the lining layer, the foam layer having a density less than about 0.035 g/m$^3$; and
a barrier layer bonded to an outboard side of the foam layer, the barrier layer having a mass per unit area less than about 130 g/m$^2$; and an acoustical attenuator portion comprising:
- a lofted mat bonded to an outboard side of the barrier layer; and
- a scrim layer bonded to an outboard side of the lofted mat, wherein the headliner has a random incidence absorption coefficient of less than 0.4 for acoustical energy incident on an inboard side of the lining layer with center frequencies from about 1.6 Hz to about 10 kHz.

13. The headliner of claim 12, wherein the lining layer is a flat knit face fabric.

14. The headliner of claim 12, wherein the barrier layer consists of a polymer sheet positioned between an upper adhesive layer and a lower adhesive layer.

15. The headliner of claim 14, wherein the polymer sheet is nylon 6.

16. The headliner of claim 12, wherein the foam layer is constructed from urethane foam.

17. The headliner of claim 12, wherein the lofted mat is constructed from a blend of glass
fibers and polypropylene.

18. The headliner of claim 12, wherein the scrim layer is formed from polyethylene terephthalate.

19. The headliner of claim 12, wherein the headliner has a random incidence absorption coefficient of greater than about 0.5 for acoustical energy with center frequencies from about 1.3 kHz to about 10 kHz incident on an outboard side of the headliner.

20. The headliner of claim 12 wherein:
- the headliner has a random incidence absorption coefficient of greater than about 0.2 and less than about 0.3 for acoustical energy with center frequencies from about 1.25 kHz to about 2.5 kHz incident on the inboard side of the headliner; and
- the headliner has a random incidence absorption coefficient of greater than about 0.5 for acoustical energy with center frequencies from about 1.3 kHz to about 10 kHz incident on the outboard side of the headliner.

* * * * *